United States Patent [19]

Leary et al.

[11] Patent Number: 5,301,295
[45] Date of Patent: Apr. 5, 1994

[54] DATA PROCESSOR APPARATUS AND METHOD WITH SELECTIVE CACHING OF INSTRUCTIONS

[75] Inventors: Kevin W. Leary, Walpole; James D. Donahue, Waltham, both of Mass.

[73] Assignee: Analog Devices, Inc., Norwood, Mass.

[21] Appl. No.: 704,290

[22] Filed: May 22, 1991

[51] Int. Cl.$^5$ .............................................. G06F 13/00
[52] U.S. Cl. .................................. 395/425; 395/400; 395/375; 364/DIG. 1; 364/243.42; 364/247.6; 364/263.1
[58] Field of Search ............................... 395/400, 425; 364/200 MS File, 900 MS File

[56] References Cited

U.S. PATENT DOCUMENTS

| | | | |
|---|---|---|---|
| 4,847,753 | 7/1989 | Matsuo et al. | 395/425 |
| 4,894,772 | 1/1990 | Langedorf | 395/375 |
| 4,942,520 | 7/1990 | Langedorf | 395/425 |
| 4,980,823 | 12/1990 | Liu | 395/425 |
| 5,101,341 | 3/1992 | Circello et al. | 395/375 |
| 5,142,634 | 8/1992 | Fite et al. | 395/375 |

OTHER PUBLICATIONS

ADSP-2100 User's Manual, Analog Devices, Inc., 1986, pp. 2-56 through 2-60.
Third-Generation TMS320 User's Guide, Texas Instruments, Inc., 1988, pp. 4-15 through 4-19.
MC68020 32-Bit Microprocessor User's Manual, Motorola, Inc., 1984, pp. 7-1 through 7-4.

Primary Examiner—Joseph L. Dixon
Assistant Examiner—Frank J. Asta
Attorney, Agent, or Firm—Kopel & Jacobs

[57] ABSTRACT

The effective capacity of an instruction cache in a digital signal processor with a modified HARVARD architecture is enhanced by decoding a current instruction to be executed to determine whether it is a program memory data access (PMDA) instruction that requires a data transfer from the program memory when the next instruction is fetched from the program memory. If it is a PMDA instruction, the next instruction is loaded into a cache, which then provides the stored instruction each time the PMDA instruction reappears. This relieves a bottleneck resulting from a simultaneous call for both the next instruction, and datum for the current instruction, from the program memory. The cache is used only for an instruction following a PMDA instruction, and can thus have a substantially smaller capacity than previously.

16 Claims, 6 Drawing Sheets

DATA PROCESSOR APPARATUS AND METHOD WITH SELECTIVE CACHING OF INSTRUCTIONS

BACKGROUND OF THE INVENTION

1. Field of the Invention

This invention relates to data processing apparatus and methods in which an instruction cache is used to store instructions within a central processor unit and thereby relieve the demand for instructions from an external program memory.

2. Description of the Related Art

Figure 1:
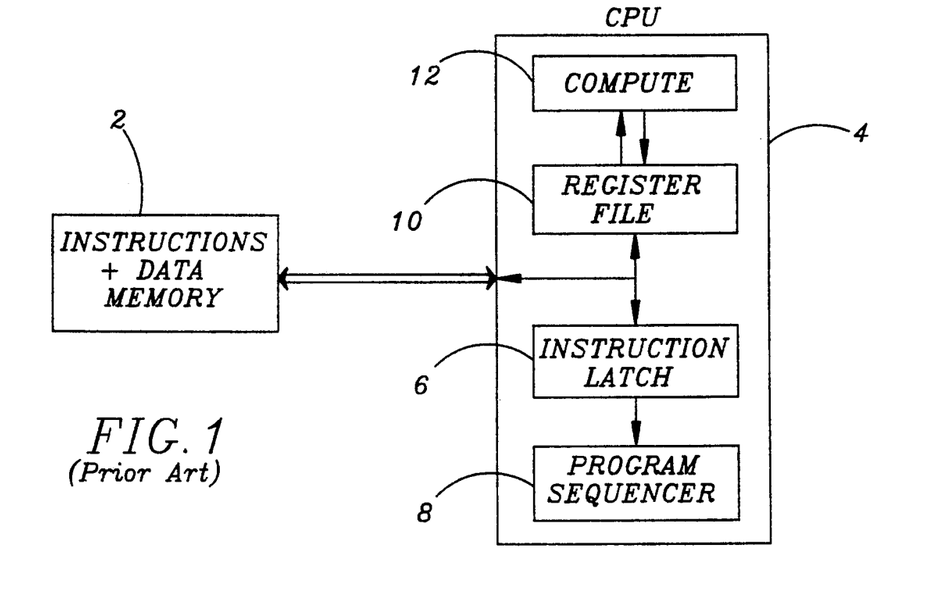
FIGS. 1-4 are block diagrams of prior digital signal processor architectures, described above.

A data processor with a conventional Von Neumann architecture is shown in FIG. 1. Both instructions and data are stored in an external memory 2 for delivery to a central processing unit (CPU) 4. Only a single instruction or datum can be supplied per cycle to the CPU 4. Instructions are directed within the CPU to an instruction latch 6 that feeds the instruction to a program sequencer 8, which in turn decodes the instruction and controls the operation of the CPU. Data that is read from the external memory 2 is directed within the CPU to a register file 10, which in turn supplies the data to computation units 12 such as adders, subtractors, multipliers and dividers. To perform an operation such as C=A+B, where A and B reside in the memory 2 and C will be stored in the register file 10, three cycles of the CPU are necessary to transfer the two data items and the one instruction. As the current instruction C=A+B is being performed, the next instruction to be performed is being read.

Figure 2:
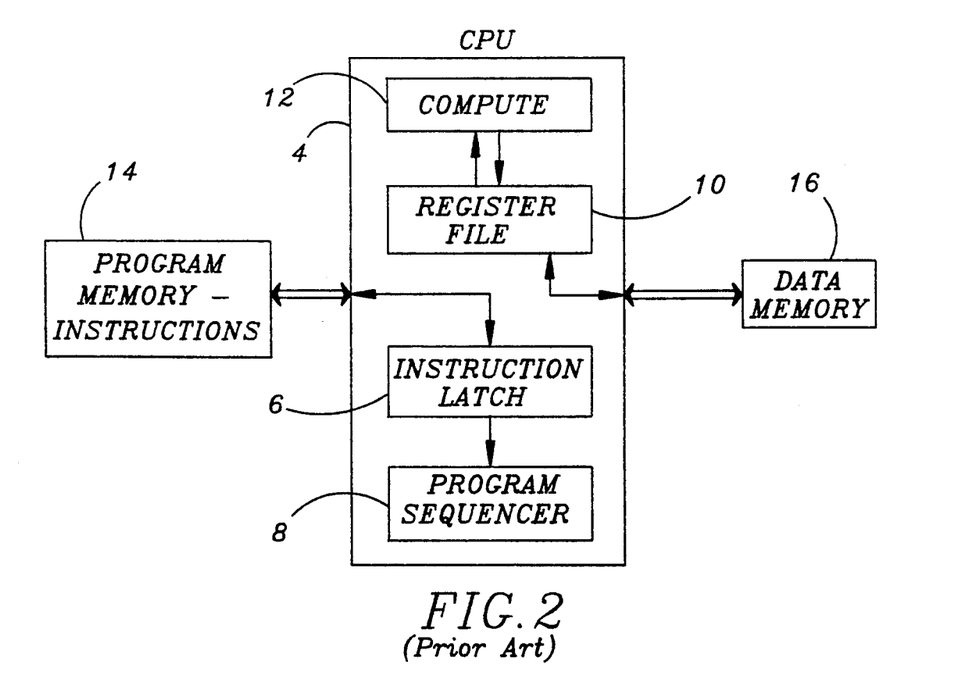

To speed up the operation of the processor by reducing the number of cycles required to execute an instruction, the basic Harvard architecture shown in FIG. 2 has been devised. In this arrangement two separate external memories are provided. A program memory 14, sometimes referred to as an instruction memory, stores only instructions, while a data memory 16 stores only data. The program memory 14 supplies one instruction per cycle to the instruction latch 6, while the data memory 16 supplies one datum per cycle to the register file 10. The performance of the C=A+B operation is speeded up by one cycle with this architecture, since an instruction fetch from the program memory 14 can be accomplished in the same cycle as a data fetch from data memory 16. For an arithmetic operation with only a single operand, such as C=log(A), only a single cycle is required; the single data fetch from the data memory 16 can be performed simultaneously with an instruction fetch from the program memory 14.

Figure 3:
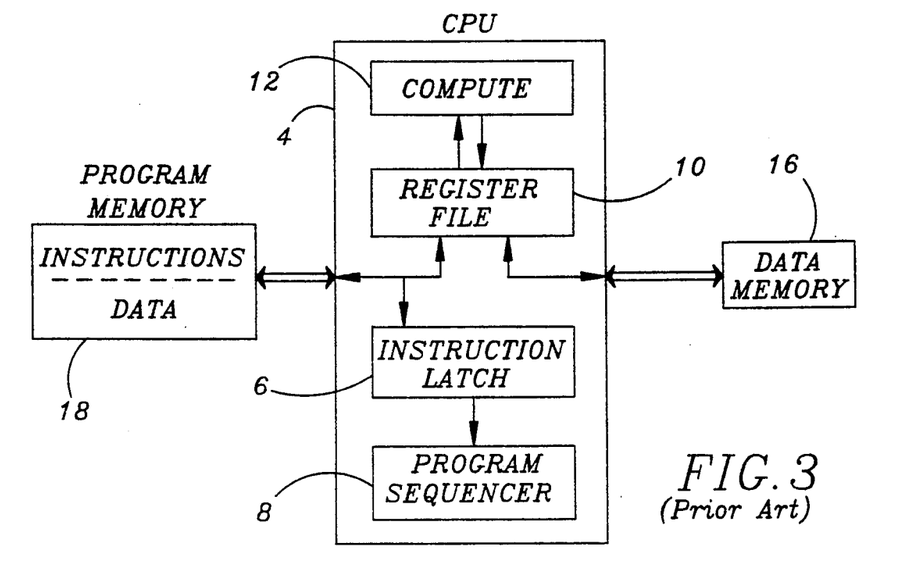

Because processors often consume two data per operation, it is desirable to have two separate data sources. A modified Harvard architecture that accomplishes this is shown in FIG. 3. In this design the program memory 18 stores both instructions and data. The operation C=A+B can now be performed in a single cycle if data can be read in from both the data memory 16 and the program memory 18 simultaneously. However, the instruction latch 6 still needs to receive the next instruction from the program memory 18 at the same time data for the current instruction is called for. This produces a bottleneck on the path between program memory 18 and the CPU, forcing the fetching of the next instruction and the data for the current instruction from the program memory to be performed in two separate cycles.

Figure 4:
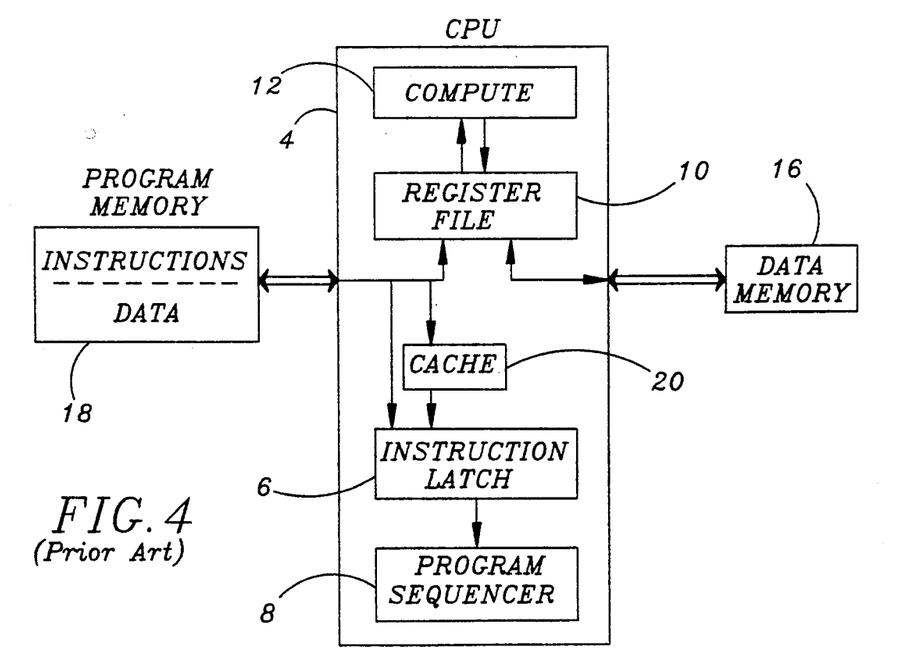

A known type of architecture that solves this problem by adding an instruction cache 20 internally within the CPU is shown in FIG. 4. Typical programs executed by the CPU spend most of their execution time in a few main routines or tight loops in which instructions are repeated many times. The instruction cache 20 stores each separate instruction the first time it is fetched from the program memory. Thereafter, when the same instruction is called for, it is supplied from the instruction cache 20 to the instruction latch 6 over a dedicated internal path within the CPU. This relieves the load on the external path between the CPU and the program memory. The type of architecture illustrated in FIG. 4 is used, for example, in the Analog Devices ADSP-2100, the Texas Instruments TMS320 and the Motorola MC68020 data processors.

While the instruction cache technique illustrated in FIG. 4 effectively relieves the communication line between the CPU and the external program memory and allows for faster operation, it requires storage capacity for all of the different instructions that can be anticipated, and thus must be relatively large and expensive.

SUMMARY OF THE INVENTION

The present invention seeks to retain the benefits of the internal instruction cache, including a more rapid execution of a program, with a cache that is substantially smaller and less expensive than those previously used.

The accomplishment of this goal is based upon a recognition that many instructions previously stored in the instruction cache are not actually needed in the cache to relieve a bottleneck between the CPU and the external program memory, and that eliminating such instructions from the cache will not reduce the attainable operating speed. The invention provides a mechanism for discriminating between instructions that require data fetches from the program memory, and thus result in a bottleneck between the program memory and the CPU (such program memory data access instructions are hereinafter referred to as "PMDA instructions"), and other types of instructions. Only instructions that would follow a PMDA instruction, and are thus called for at the same time as a data fetch from the program memory, are stored in the cache. Other instructions are provided to the instruction latch directly from the program memory. This allows for a reduction in the size of the instruction cache without adding more bottlenecks, since the instructions that are provided directly from program memory rather than from the cache, do not produce bottlenecks.

The processor operates by fetching data from memory for the execution of one instruction while the next instruction in sequence is being fetched. Once a PMDA instruction has been identified, the following instruction is therefore stored in the cache, rather than the PMDA instruction itself. If an instruction following a PMDA instruction is already stored in the cache, a duplicative storage of the same instruction the next time it appears is prevented by also storing the associated external memory address for the instruction within the cache, and recognizing subsequent appearances of the same address.

Further features and advantages of the invention will be apparent to those skilled in the art from the following detailed description, taken together with the accompanying drawings, in which:

DETAILED DESCRIPTION OF A PREFERRED EMBODIMENT

Rather than loading all instructions into an instruction cache, the invention provides a special cache control scheme that loads only an instruction following a PMDA instruction into the cache. A bottleneck on the line between the CPU and the program memory is produced only for an instruction following a PMDA instruction, so that failing to load other instructions into the cache will not detract from its ability to prevent bottlenecks. Since many fewer instructions need be stored in the cache, the size and expense of the cache can be significantly reduced without degrading the system's speed of operation.

Figure 5:
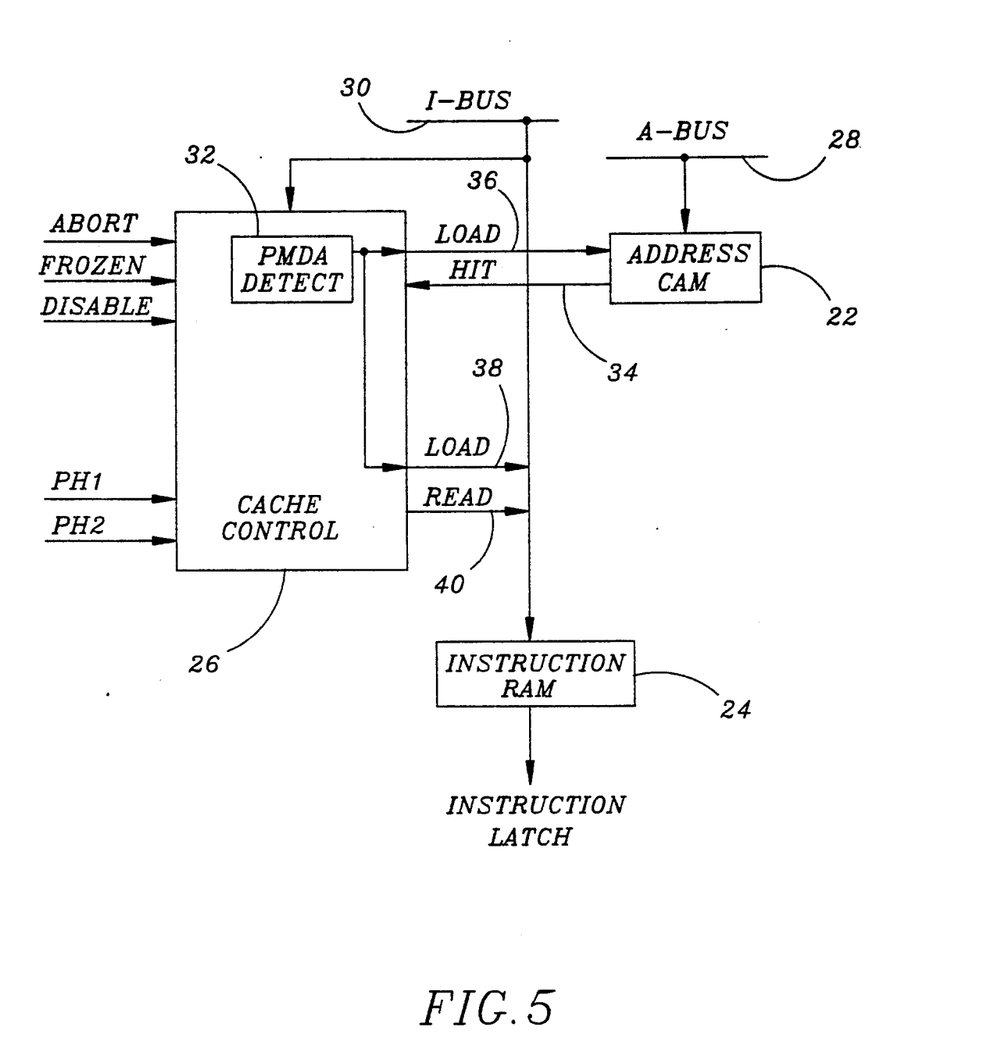
FIG. 5 is a block diagram of a selective instruction cache in accordance with the invention.

A block diagram of the basic cache components in a preferred embodiment is presented in FIG. 5. The cache consists of an address contents addressable memory (CAM) 22, an instruction random access memory (RAM) 24, and a control section 26. The memory address external to the cache for the next instruction to be executed is directed onto an address bus 28 by the program sequencer, while an instruction to be executed is presented on an instruction bus 30 from the external program memory (the abbreviations A for address and I for instruction are used in the drawings). The provision of an address CAM, instruction RAM and cache control section is known, but the selection of only instructions following a PMDA instruction for loading into the cache is an important feature of the invention.

The cache control includes a detection section 32 that detects whether the current instruction being executed is a PMDA instruction. If it is, the address CAM 22 is interrogated to determine whether the address of the following instruction, which address is then on the address bus 28, is already stored in the address CAM. For each successive instruction address the address CAM 22 produces a constant signal that indicates whether the address on the bus is already stored. If the address is already in the CAM, a "HIT" signal is produced; if it is not yet stored in the CAM, a "MISS" signal is produced. The production of HIT and MISS signals by an address CAM of this type is conventional. With prior systems, however, the address CAM is interrogated for each successive instruction address, and the address is loaded into the CAM each time a MISS is indicated. With the present invention, on the other hand, the HIT/MISS signal from the address CAM is used only if a PMDA instruction has been detected. If a PMDA instruction is present and the address CAM provides a MISS signal over line 34 to the cache control, the cache control delivers signals over lines 36 and 38 which cause the address CAM and instruction RAM to respectively load the address for the next instruction from the address bus 28, and the next instruction from the instruction bus 30. The cache control includes a timing circuit, described below in connection with FIG. 7, to synchronize the PMDA detection for the current signal with the cache load commands for the following signal. The next instruction is also sent from the instruction bus to the instruction latch (external to the cache). If there is a PMDA instruction but a HIT signal is produced, a READ signal is delivered over line 40 from the cache control. This signal causes the next instruction to be read out from the instruction RAM 24 to the instruction latch at the appropriate time.

The operation of the cache control is governed by a two phase clock that provides a pair of sequential phase signals PH1 and PH2 during each cycle. The cache control section can be overridden for various conditions, such as a user controlled DISABLE mode that allows a new program to be tested, a user controlled FROZEN mode that freezes the cache when it has been loaded with the most significant instructions in a program so that these instructions are not bumped from the cache by subsequent but less significant instructions, or by an ABORT mode initiated by the program sequencer in the case of a malfunction.

Figure 6:
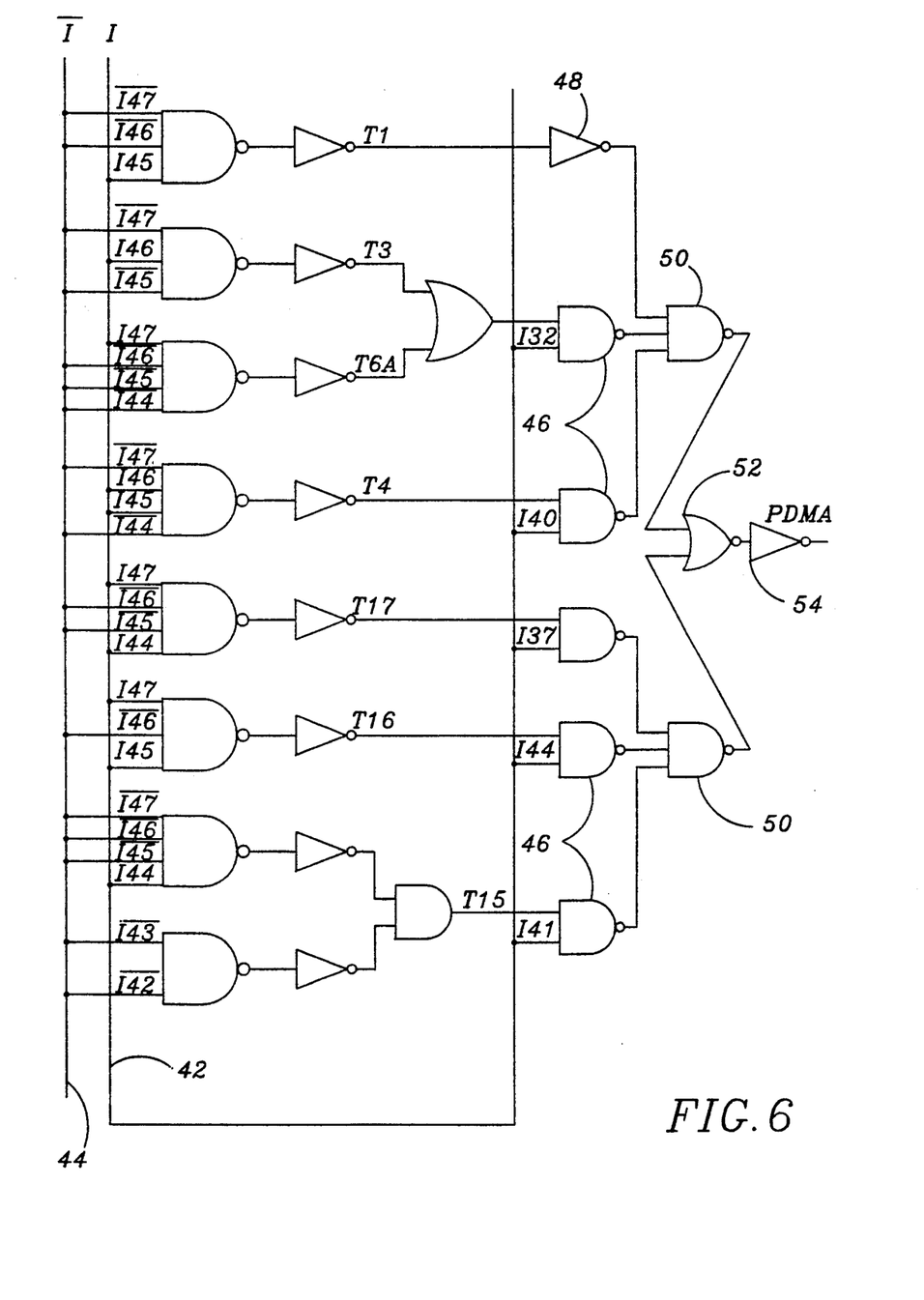
FIG. 6 is a logic diagram of the instruction-type decoding used for one system.

An exemplary logic circuit that is used to detect whether a current instruction is a PMDA instruction is shown in FIG. 6. In general, each different processor can employ its own unique instruction format. In the exemplary system described herein, there are approximately 25 different instruction types, of which 7 are PMDA instructions. The PMDA instructions, or their progenitors, are designated T1, T3, T4, T6A, T15, T16, and T17. Regardless of the particular instruction format used in a given system, some of the instruction bits can be used to characterize the instruction as to type, while other bits are devoted to actually executing the instruction upon one or more operands. In the exemplary system each instruction consists of 48 bits, of which bit numbers 32, 37 and 40-47 are used to identify PMDA instructions (the first instruction bit is designated number "0").

In FIG. 6 the terminology I47, I46 . . . refers to HIGH signals on bit numbers 47, 46, etc., while 147, 146 . . . refers to a LO signals for bit numbers 47, 46, etc. ("HIGH" and "LO" can alternately be designated "1" and "0", respectively).

The instruction bit signals are carried on an appropriate bus 42, while an inverted bit signal bus 44 is constructed by simply inverting the signal for each bit location from the non-inverted bit signal bus 42.

Each of the PMDA instructions corresponds to the presence or absence of particular bit signals, and appropriate logic circuitry is provided to identify each one. In FIG. 6 the series combination of a NAND gate and an invertor is used to test for the presence of the appropriate combination of bit signals for each instruction type. The equivalent function is a logic AND, but a NAND gate is used first and its output inverted so that signals may be obtained from the outputs of the AND gates to use for purposes not directly related to the PMDA instruction identification. The combination of bit signals corresponding to each PMDA instruction-type or progenitor is as follows:

T1: I45, I46, I47
T3: I45, I46, I47
T6A: I44, I45, I46, I47
T4: I44, I45, I46, I47
T15: I42, I43, I44, I45, I46, I47

T16: I45, I46, I47
T17: I44, I45, I46, I47

Of the above signals, T1 is itself a PMDA instruction, and the remainder are preliminary PMDA progenitors that, when combined with other bit signals, correspond to PMDA instructions. The remaining PMDA instructions are formed by the following combinations:

T3, I32
T6A, I32
T4, I40
T15, I41
T16, I44
T17, I37

The "inverted" presence of a PMDA instruction for T3, T6A, T4, T15, T16 and T17 is determined by applying the T-signal and its corresponding additional instruction bit to respective NAND gates 46, while the T1 signal is simply inverted through invertor 48. The resulting signals are then combined in NAND gates 50, which produce an output HIGH signal if one of their inputs corresponds to the presence of a PMDA instruction. The outputs of NAND gates 50 are processed through a NOR gate 52 that produces a LO output if one of its inputs is HIGH. Finally, the output of NOR gate 52 is inverted by invertor 54 to produce an output that is HIGH for a PMDA instruction, but LO at other times.

Figure 7:
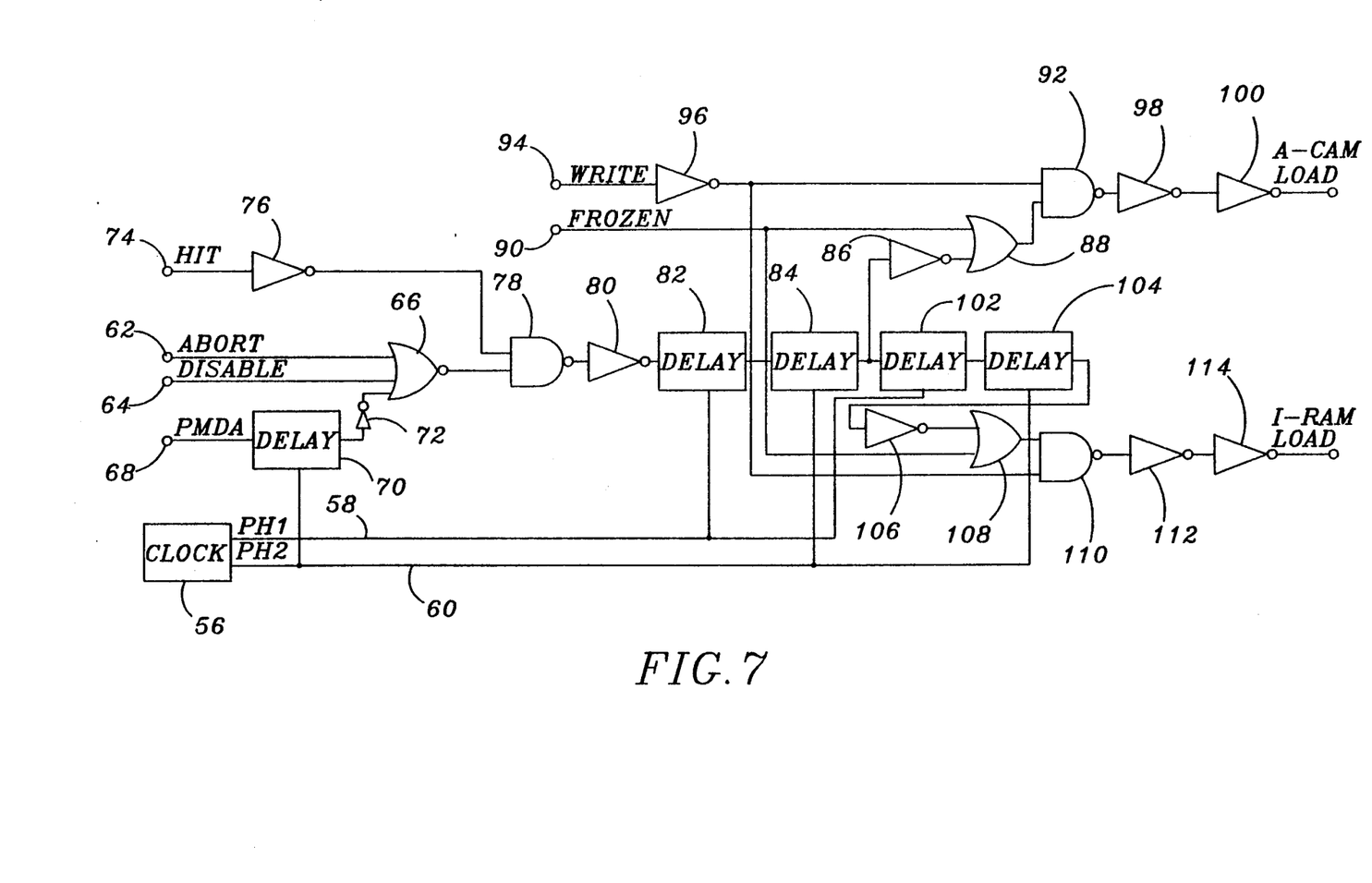
FIG. 7 is a block diagram of the portion of a cache control system that governs the loading of instructions and their associated memory addresses into the cache.

Exemplary circuitry used to activate the loading of an instruction following a PMDA instruction into the cache instruction RAM 24, and its memory address into the cache address CAM 22, is shown in FIG. 7. The system operation is controlled by a two-phase clock 56 that produces a HIGH signal on clock line 58 during the first half of each cycle, and a HIGH signal on clock line 60 during the second half of each cycle.

Input terminals 62, 64 for ABORT and DISABLE signals, respectively (discussed in connection with FIG. 5), are connected as inputs to a NOR gate 66. The output signal from FIG. 6, indicating the presence of a PMDA construction, is supplied from terminal 68 to a delay circuit 70, which delays it by a half cycle to synchronize the PMDA signal with the ABORT and DISABLE signals; these latter signals are not available until a half-cycle after the PMDA signal has been generated. The delayed PMDA signal is then processed through an invertor 72, and the inverted signal is applied together with the ABORT and DISABLE lines to NOR gate 66. A HIGH output from NOR gate 66 indicates the concurrent presence of a PMDA instruction and absence of an ABORT or DISABLE signal.

A HIT signal from the cache address CAM is applied by terminal 74 to an invertor 76, the output of which is HIGH if the memory address of the instruction currently on the address bus 28 (FIG. 5) has not yet been entered into the address CAM (a MISS). The MISS signal is applied together with the output from NOR gate 66 to a NAND gate 78, the output of which is inverted by invertor 80. A HIGH output from invertor 80 corresponds to the presence of a PMDA instruction, the absence of the following instruction from the cache, and the absence of an ABORT or DISABLE signal.

The output of invertor 80 undergoes a full cycle delay through delay circuits 82 and 84 to synchronize the detected PMDA instruction with the loading of the memory address for the following instruction into the address CAM. An invertor 86 inverts the output of delay circuit 84 and applies the inverted signal to an OR gate 88, which also receives an input from terminal 90 that is HIGH when a "cache frozen" signal is present. The output of OR gate 88 is HIGH for either the presence of a "cache frozen" signal, or the absence of a PMDA instruction. This output is processed through a NAND gate 92 together with an inverted input from terminal 94. The latter terminal receives a "cache array write" signal that is used for internal testing, and allows data to be written into the cache for testing purposes. After the "cache array write" signal has been processed by invertor 96, the output of NAND gate 92 will be HIGH in response to the presence of a PMDA instruction together with the absence of DISABLE, ABORT or cache frozen signals, or in response to the presence of a "cache array write" signal. The output of NAND gate 92 is amplified by invertors 98 and 100, and used to activate the address CAM load. With the timing sequence established in the circuit of FIG. 7, this causes the memory address of the instruction following the PMDA instruction to be loaded into the address CAM 22. In the described system the instruction addresses are effectively 24-bit words.

To control loading of the instruction RAM 24, the output of delay circuit 84 is delayed for another full cycle by delay circuits 102 and 104. This allows for synchronization between the detection of the PMDA instruction and loading the following instruction into the instruction RAM. In a manner similar to the generation of the address CAM load signal, the output of delay circuit 104 is processed through an invertor 106 and applied as one input to an OR gate 108, with the second input to OR gate 108 provided from the "cache frozen" terminal 90. The "cache array write" signal on terminal 94 is inverted and applied as an input to a NAND gate 110, with a second input to gate 110 provided from the output of OR gate 108. A HIGH output from NAND gate 110 thus corresponds to the presence of a PMDA instruction together with the absence of DISABLE, ABORT or cache frozen signals, or to the presence of a "cache array write" signal. This output is then amplified by invertors 112 and 114. A HIGH output causes the instruction RAM 24 to load the 48 bit instruction then on the instruction bus 30. Because of the timing delays provided by the FIG. 7 circuit, the instruction following the detected PMDA instruction is loaded into the instruction RAM.

Figure 8:
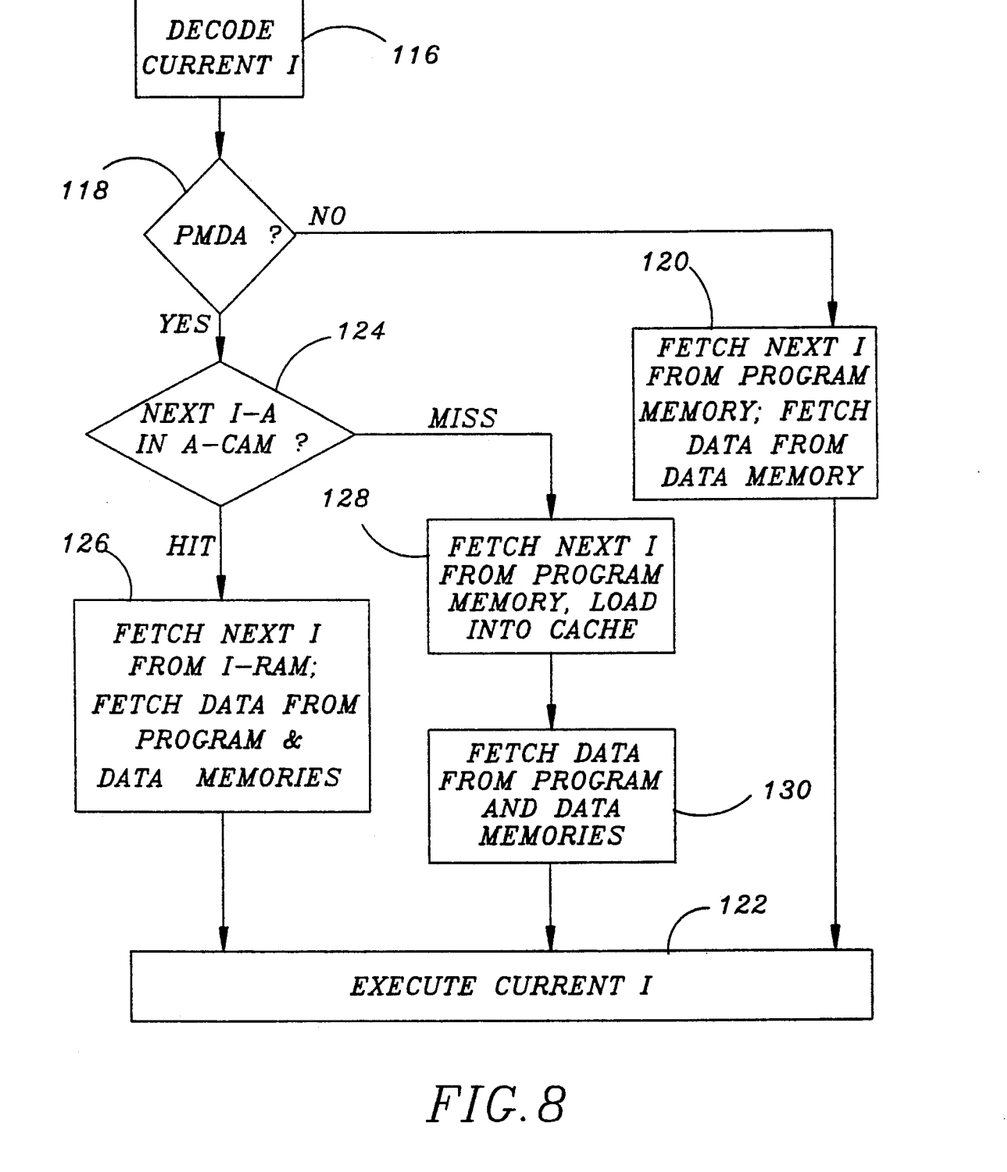
FIG. 8 is a flow diagram summarizing the sequence of operations in executing an instruction.

The operation of the system can be summarized with the assistance of the flow chart in FIG. 8. The current instruction is first decoded (block 116), and a decision is made as to whether or not it is a PMDA instruction (block 118). If it is not a PMDA instruction, the next instruction is fetched from the program memory and the datum necessary for execution of the current instruction is fetched from the datum memory (block 120). The current instruction can then be executed by operating upon its fetched datum (block 122).

If a PMDA instruction is identified, the address CAM is queried to determine whether the memory address for the following instruction, from address bus 28, is already stored in the address CAM (block 124). If the instruction address is already stored (a HIT), the next instruction is fetched into the instruction latch from the instruction RAM, and data necessary to execute the current instruction is fetched from both the program and data memories (block 126). Since the next instruction is provided from the cache rather than from the program memory, no bottleneck results in executing the current PMDA instruction (block 122).

If the memory address for the next instruction has not previously been stored in the cache (a MISS), the next instruction is fetched from the program memory and loaded into the cache (block 128). Data for the current instruction can then be fetched from both the program and the data memories (block 130), followed by execution of the current instruction (block 122). The need to fetch the next instruction from the program memory results in a bottleneck, since the required data from the program memory cannot be fetched at the same time. However, this is a one-time occurrence because the next instruction will now be loaded into the cache. Each time the PMDA instruction reappears the next instruction can be obtained from the cache, thus avoiding another bottleneck.

A PMDA instruction will normally be followed by the same instruction in sequence each time the PMDA instruction appears. However, for a situation such as a conditional branch, a PMDA instruction may be followed by one instruction one time and by a second instruction another time. This is easily handled by the invention, since the cache control decodes the memory address for the instruction following the PMDA instruction, not for the PMDA instruction itself, to determine whether the following instruction is already stored in the cache. The identity of the following instruction determines whether or not it should be loaded into the cache, and whether the instruction should be provided to the instruction latch from the program memory or from the cache.

By distinguishing between PMDA and non-PMDA instructions, and loading only the instruction following a PMDA instruction into the cache, a substantially smaller and less expensive cache can be used without any increase in bottlenecks. Conversely, a substantial enhancement in the effective cache capacity can be achieved for a given cache size.

While a particular embodiment has been shown and described, numerous modifications and alternate embodiments will occur to those skilled in the art. For example, the invention is also useful in preventing bottlenecks with a digital signal processor that does not have a discrete data memory, but instead fetches all data from the program memory. Accordingly, it is intended that the invention be limited only in terms of the following claims.

We claim:

1. In a digital signal process having a data memory for storing data, a program memory for storing both instructions and data, and a central processing unit that includes an instruction latch for temporarily storing instructions fetched from the program memory, a program sequencer for decoding instructions from the instruction latch and controlling the operation of decoded instructions upon fetched data, and an instruction cache for storing instructions fetched from the program memory, said instruction cache supplying a stored instruction to the instruction latch when said instruction is subsequently called for, wherein the improvement comprises:

means for discriminating between instructions that require a data fetch from the program memory (PMDA instructions) and non-PMDA instructions that do not require a data fetch from the program memory, and means for storing in the instruction cache only those instructions which immediately follow a PMDA instruction, and for fetching non-PMDA instructions from the program memory directly into the instruction latch, bypassing the instruction cache.

2. The digital signal processor of claim 1, further comprising means responsive to a PMDA instruction for determining whether an instruction immediately following a PMDA instruction is already stored in the instruction cache, and for disabling the duplicative storage of said associated instruction in the instruction cache if it is already stored.

3. The digital signal processor of claim 1, said processor fetching data from memory for the execution of one instruction while the next instruction in sequence is being fetched, wherein said means for storing instructions in the instruction cache stores the instruction following a PMDA instruction, but not the PMDA instruction itself, in the instruction cache.

4. The digital signal processor of claim 3, said discriminating means comprising means for evaluating at least one but less than all of the bits of a multibit instruction to determine if it is a PMDA instruction.

5. The digital signal processor of claim 4, said discriminating means evaluating a predetermined set of instruction bits to make a preliminary determination of whether an instruction is a PMDA instruction, and comparing positive results of said preliminary determination with a further predetermined instruction bit to make a final determination of whether the instruction is a PMDA instruction.

6. The digital signal processor of claim 4, further comprising means for disabling the loading of an instruction into the instruction cache during a disable condition selected from one or more of the following conditions: (a) an abort signal from the program sequencer, (b) an operator controlled cache disable signal, and (c) an operator controlled cache freeze signal that prevents replacement of instructions presently in the cache with new instructions.

7. The digital signal processor of claim 3, said discriminating means producing a logic signal which corresponds to the presence of a PMDA instruction, and including a delay means which operates upon said logic signal to synchronize the loading into the instruction cache of an instruction following a PMDA instruction with the generation of said logic signal.

8. An instruction cache system for supplying instructions to the instruction latch of a digital signal processor, said instructions having associated external memory addresses, comprising:

an instruction cache for storing selected instructions, an address memory for storing the addresses associated with the instructions stored in the instruction cache, a cache control for loading selected instructions into the instruction cache and their respective addresses into the address memory, and for reading out selected instructions from the instruction cache, means for applying selected bits of an input multibit instruction which identify the instruction as to type to said cache control, said cache control including means responsive to said selected instruction bits for recognizing whether the multi-bit input instruction is an instruction requiring at least two operands (a PMDA instruction), and means responsive to the recognition of an input PMDA instruction for determining whether the instruction immediately following said PMDA instruction is already stored in the instruction cache, said cache control responding to the recognition of a PMDA instruction by directing the loading of an instruction immediately following the PMDA instruction into said instruction cache and the loading of the address associated with said instruction following the PMDA instruction into said address memory if said instruction following the PMDA instruction is not already stored in the instruction cache, and by directing the reading of said instruction following the PMDA instruction from said instruction cache to said instruction latch if said instruction following the PMDA instruction is already stored in said instruction cache, said cache control responding to the recognition of a non-PMDA instruction by not loading the instruction immediately following said non-PMDA instruction into the instruction cache.

9. The instruction cache system of claim 8, said cache control producing a logic signal which corresponds to the presence of a PMDA instruction, and including a delay means which synchronizes the loading into the instruction cache of an instruction following the PMDA instruction with the generation of said logic signal.

10. The instruction cache system of claim 9, further comprising clock means establishing a signal processing rate for said instruction cache system, said delay means delaying said logic signal by one clock cycle to synchronize the loading of said address for said instruction following the PMDA instruction into the address memory, and by two clock cycles to synchronize the loading of said instruction following the PMDA instruction into said instruction cache.

11. The instruction cache system of claim 8, further comprising means for disabling a duplicative storage of said instruction following the PMDA instruction if it is already stored in the instruction cache.

12. The instruction cache system of claim 11, wherein said means for determining whether the instruction following said PMDA instruction is already stored operates by interrogating said address memory to determine whether it is already storing an instruction address which corresponds to said instruction following said PMDA instruction.

13. The instruction cache system of claim 8, said cache control including means to test for the presence of a selected instruction int he instruction cache by addressing said address memory to determine therein the presence or absence of an address corresponding to said selected instruction.

14. The instruction-cache system of claim 8, said means for recognizing whether an input instruction is a PMDA instruction comprising means for evaluating a predetermined set of instruction bits to make a preliminary determination of whether an instruction is a PMDA instruction, and means for comparing positive results of said preliminary determination with a further predetermined instruction bit to make a final determination of whether the instruction is a PMDA instruction.

15. A method of operating an instruction cache used to store instructions for application to the instruction latch of a digital signal processor, said digital signal processor including a program memory for storing both instructions and data, and a data memory for storing data, comprising:

discriminating between instructions that require a data fetch from the program memory (PMDA instructions) and non-PMDA instructions that do not require a data fetch from the program memory, storing in the instruction cache only instructions that immediately follow a PMDA instruction, supplying instructions that immediately follow a non-PMDA instruction from said program memory directly to the program latch, without storage int eh instruction cache, and supplying a stored instruction from the instruction cache to said instruction latch immediately after its preceding PMDA instruction has been supplied to said instruction latch.

16. The method of claim 14, further comprising the steps of determining whether the instruction following a PMDA instruction is already stored in the instruction cache in response to the recognition of a PMDA instruction, and disabling a duplicative storage of said instruction following the PMDA instruction if it is already stored in the instruction cache.

* * * * *